United States Patent [19]
Maus

[11] Patent Number: 5,866,230
[45] Date of Patent: Feb. 2, 1999

[54] EXTRUDED HONEYCOMB BODY OF CERAMIC AND/OR METALLIC MATERIAL WITH INCREASED FLEXIBILITY

[75] Inventor: Wolfgang Maus, Bergisch Gladbach, Germany

[73] Assignee: Emitec Gesellschaft fuer Emissionstechnologie GmbH, Lohmar, Germany

[21] Appl. No.: 797,856

[22] Filed: Feb. 10, 1997

Related U.S. Application Data

[63] Continuation of Ser. No. 484,659, Jun. 7, 1995, abandoned.

[30] Foreign Application Priority Data

Jan. 11, 1993 [DE] Germany .......................... 43 00 477.6
Jan. 10, 1994 [WO] WIPO ...................... PCT/EP94/00044

[51] Int. Cl.⁶ ....................................................... B32B 3/12
[52] U.S. Cl. .......................... 428/116; 428/118; 422/180; 55/520; 55/523
[58] Field of Search ..................................... 428/116, 118, 428/174, 34.4; 55/520, 521, 522, 523; 502/527; 422/174, 180

[56] References Cited

U.S. PATENT DOCUMENTS

| | | | |
|---|---|---|---|
| 3,853,485 | 12/1974 | Hogan ...................................... | 502/300 |
| 3,983,283 | 9/1976 | Bagley .................................... | 428/116 |
| 4,323,614 | 4/1982 | Gulati ..................................... | 428/116 |
| 4,448,828 | 5/1984 | Mochida et al. ....................... | 428/34.4 |
| 4,665,051 | 5/1987 | Nonnenmann .......................... | 422/180 |
| 4,758,272 | 7/1988 | Pierotti et al. ........................... | 75/246 |
| 4,923,109 | 5/1990 | Cyron ..................................... | 422/180 |
| 5,070,694 | 12/1991 | Whittenberger ........................ | 422/180 |
| 5,139,844 | 8/1992 | Maus ..................................... | 428/116 |
| 5,328,774 | 7/1994 | Maus ..................................... | 428/116 |
| 5,370,943 | 12/1994 | Bruck .................................... | 428/116 |
| 5,405,422 | 4/1995 | Ueda ...................................... | 55/520 |
| 5,422,082 | 6/1995 | Yoshizaki .............................. | 422/180 |

FOREIGN PATENT DOCUMENTS

| | | |
|---|---|---|
| 0 245 736 | 11/1987 | European Pat. Off. . |
| 245736 | 11/1987 | European Pat. Off. . |
| 0 465 184 | 1/1992 | European Pat. Off. . |
| 0 502 731 | 9/1992 | European Pat. Off. . |
| 2 346 048 | 2/1978 | France . |
| 2 402 064 | 3/1979 | France . |
| 25 38 613 | 11/1976 | Germany . |
| 33 11 654 | 10/1984 | Germany . |
| 27 08 908 | 10/1987 | Germany . |
| 89/07488 | 8/1989 | WIPO . |
| 90/03220 | 4/1990 | WIPO . |
| 92/02714 | 2/1992 | WIPO . |
| 92/02717 | 2/1992 | WIPO . |

*Primary Examiner*—Timothy M. Speer
*Attorney, Agent, or Firm*—Herbert L. Lerner; Laurence A. Greenberg

[57] ABSTRACT

An extruded honeycomb body of a ceramic or metallic material includes a plurality of conduits being separated from each other by partitions and extending approximately parallel to each other. The partitions are disposed and shaped in at least an outer region in such a way that as seen in a cross section through the honeycomb body they do not form structures which are rigid in the radial direction and/or rigid support structures extending in the circumferential direction. Separating walls extending spirally or involute particularly increase the elasticity of a honeycomb body. Such shapes are particularly suited for electrically conductive extruded honeycomb bodies which can be used, for example, in connection with electrically heatable catalytic converters of motor vehicles.

18 Claims, 1 Drawing Sheet

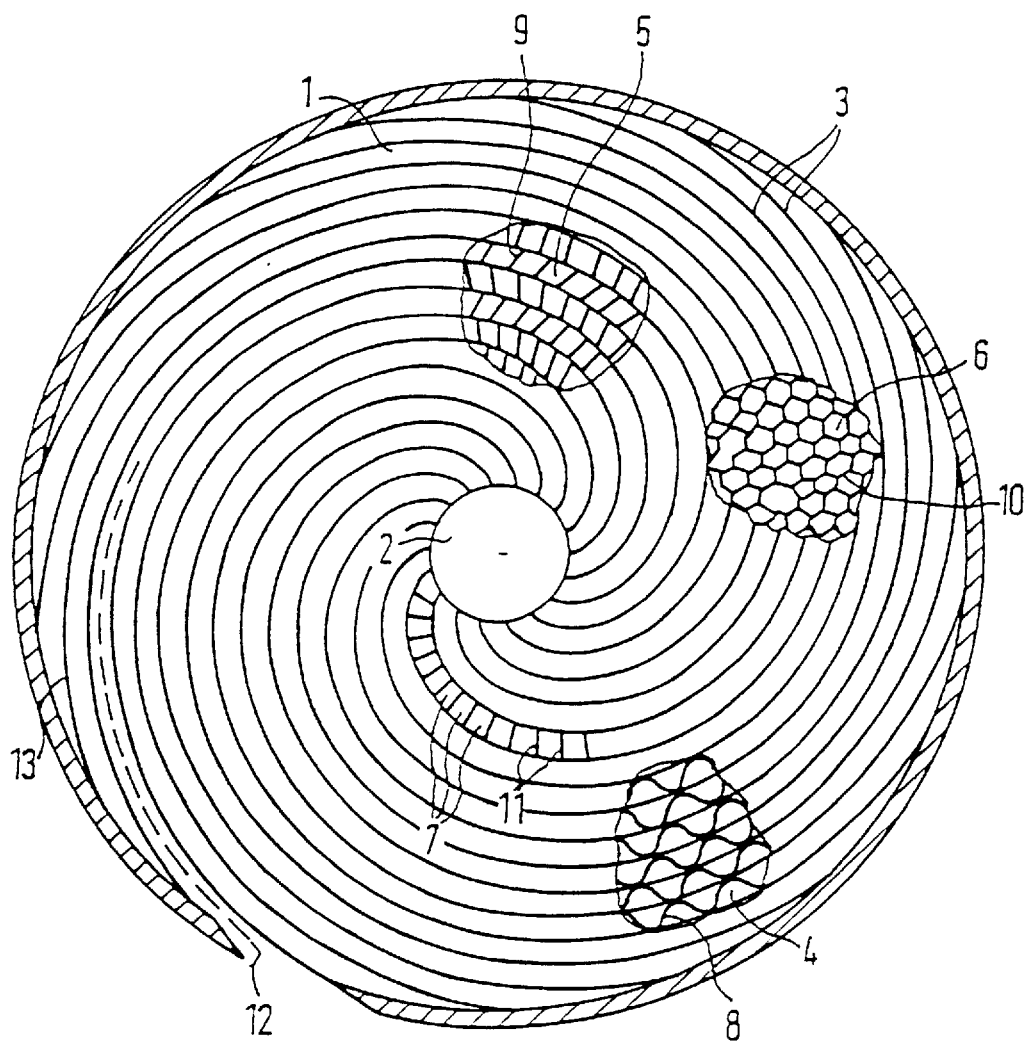

5,866,230

EXTRUDED HONEYCOMB BODY OF CERAMIC AND/OR METALLIC MATERIAL WITH INCREASED FLEXIBILITY

This application is a continuation of application Ser. No. 08/484,659, filed on Jun. 7, 1995 now abandoned.

CROSS-REFERENCE TO RELATED APPLICATION

This application is a Continuation of International Application Serial No. PCT/EP94/00044 filed Jan. 10, 1994.

BACKGROUND OF THE INVENTION

Field of the Invention

The present invention relates to an extruded honeycomb body of a ceramic or metallic material with a multiplicity of conduits being separated from each other by partitions and extending approximately parallel to each other. Such honeycomb bodies, which are used in catalytic converters of internal combustion engines in particular, have been described in U.S. Pat. No. 3,853,485, for example.

Such bodies are usually extruded from a powdery or granulate-like ceramic material, dried and subsequently baked.

Of late, that method of production has also been employed for producing electrically conductive honeycomb bodies which can be electrically heated, wherein a metallic material or a mixture of ceramic and metallic materials is used. Such honeycomb bodies have been described, for example, in European Patent Application 0 465 184 A1. In order to affect the electrical resistance and the course of an electric current in such a honeycomb body, slits are additionally provided which generally extend parallel to the extruded structures.

Either squares, rectangles or other polygons are typical cross-sectional shapes of conduits in extruded honeycomb bodies. Various polygonal progressions have been described as cross-sectional shapes in particular in U.S. Pat. No. 3,853,485, in which varied numbers of conduits per cross-sectional surface are provided in the various cross-sectional regions.

However, it is common for all heretofore-known extruded honeycomb bodies to have preferred orientations of the conduit or channel walls, wherein the preferred orientation of the conduit walls leads to reduced elasticity in the direction of the preferred orientation. With square conduits, the bodies have practically no elasticity in the direction of the webs, and elasticity is also very low in typical hexagonal honeycomb shapes. That does not even change if additional walls are disposed in various directions, as is disclosed in U.S. Pat. No. 3,853,485.

Besides the extruded honeycomb bodies which have been known for many years, honeycomb bodies made of sheet metal are employed in increasing numbers, wherein suitable honeycomb bodies are produced by suitable structuring and disposition of the sheet metal in layers. Besides the initially used honeycomb bodies wound spirally or helically from sheet metal, a plurality of shapes with considerably increased elasticity have become known in the meantime. In that connection a principal structure which is very important for elasticity has been described in European Patent 0 245 736 B1, in which the individual sheet metal layers extend in an approximately involute shape from a center outward. Honeycomb bodies produced in accordance with that principle have also been described in International Patent Application WO 90/03220, corresponding to U.S. Pat. Nos. 5,105,539; 5,135,794; and 5,139,844, and, in a somewhat changed shape, also in International Patent Application WO 92/02717, corresponding to U.S. application Ser. No. 08/016,041, filed Feb. 10, 1993. Similar properties also result in connection with bodies being formed of sheet metal wound in an S-shape, wherein the elastic properties and the oscillating behavior can be affected by additional reinforced layers, such as is described in International Patent Application Wo 89/07488, corresponding to U.S. Pat. No. 5,102,743. Those and similar structures have been shown to be particularly suited for electrically heatable honeycomb bodies, especially because of their elasticity, such as is recited in International Patent Application WO 92/02714, corresponding to U.S. Pat. No. 5,411,711.

SUMMARY OF THE INVENTION

It is accordingly an object of the invention to provide an extruded honeycomb body of ceramic and/or metallic material with increased flexibility, which overcomes the hereinafore-mentioned disadvantages of the heretofore-known devices of this general type and which increases the elasticity of extruded honeycomb bodies, wherein the elastic properties in different directions are particularly intended not to be different. The increased elasticity of such honeycomb bodies increases their useful life under thermally changing loads and permits increased flexibility in the structure, particularly with heatable honeycomb bodies.

With the foregoing and other objects in view there is provided, in accordance with the invention, an extruded honeycomb body formed of at least one of ceramic and metallic material, comprising a multiplicity of conduits; and partitions separating the conduits from one another, some of the partitions extending curved from the inside outward at least in an outer cross-sectional region of the honeycomb body.

Structures which are rigid in the radial direction lead to rigidity of the body in this direction and to the danger of breaking in case of forces attacking at an angle. Structures extending rigidly in the circumferential direction, i.e. circular structures, also increase the rigidity of the entire body. It is therefore important for the flexibility of a body to avoid such structures. In spite of this, regular symmetrical configurations in which there are always preferred directions of partitions have been used heretofore for extruded honeycomb bodies. This is not of decisive importance in the interior of a honeycomb body, although a more flexible structure should at least be selected in an exterior region of at least 30%, and preferably more than 50%, of the radius. Since present-day molds for extruders are mainly produced by electric corrosion, the practically arbitrary shaping of conduit walls does not present a technical problem, even though no attempts had been made to provide other conduit shapes of polygonal cross section because of various prejudices in the technical field. One reason for that may be that following extrusion the bodies are at first relatively soft, so that a certain amount of rigidity is quite desirable, at least in the direction in which gravity acts. In spite of that an almost arbitrary shaping of the conduit walls is possible with modern production techniques even from that point of view.

In accordance with another feature of the invention, if a portion of the partitions extends curved in cross section from the inside to the outside, in at least an outer region, the partitions extend spirally and in particular approximately involutely from the inside to the outside. Such shapes are particularly elastic and yet allow the even filling of a cross section with partitions.

There are many possibilities for dividing the intervals between the curved partitions into conduits through the use of further partitions. It is again important in this case that the partitions between the curved partitions do not form rigid webs between each other in the radial direction. The direction of the transverse webs between the curved partitions should therefore be adapted to their course.

In accordance with a further feature of the invention, there are provided transverse webs disposed between the curved partitions, the transverse webs including radially adjacent transverse webs being located in different radial planes.

The present invention is particularly suitable for honeycomb bodies extruded from metallic materials which are sintered. The present invention is also particularly important for honeycomb bodies made from an extruded mixture of metal and ceramic powders, in which the intention is to cut slits for their electrically insulated separation. Since such slits usually divide the body in such a way that a current can flow through it in a meander shape, the regions adjoining the slits are particularly stressed mechanically, so that elastic structures result in great advantages in this case.

Therefore, in accordance with an added feature of the invention, the partitions are formed of electrically conductive material, in particular an extruded mixture of metal powder and ceramic powder and define slits for an electrically insulating subdivision.

In accordance with an additional feature of the invention, the course of the slits in the honeycomb bodies is parallel to the curved partitions, and in particular parallel with partitions which extend spirally or involute.

In accordance with yet another feature of the invention, some of the partitions are thicker than others of the partitions.

In accordance with yet a further feature of the invention, since linearly extending wall sections always have a different flexibility in different directions, the partitions in the extruded honeycomb bodies also essentially are formed of curved sections. Such a shape results automatically with honeycomb bodies being wound from variously corrugated sheet metal layers, while so far it had not been considered for extruded honeycomb bodies.

However, increased elasticity can also be achieved with polygonal cross sections if the conduits themselves are not disposed along straight lines, but along lines which are curved from the inside to the outside, preferably along approximately involute lines. The elasticity of bodies constructed in this manner is also clearly increased in comparison with bodies having conduits disposed along straight lines.

With the objects of the invention in view, there is also provided an extruded honeycomb body formed of at least one of ceramic and metallic material, comprising a multiplicity of individual flow conduits having a substantially polygonal cross section; and partitions separating the flow conduits from one another; the flow conduits being disposed along lines being curved and preferably involute from the inside outward, and the flow conduits being spaced apart from one another along the lines, having walls not being parallel to one another.

Other features which are considered as characteristic for the invention are set forth in the appended claims.

Although the invention is illustrated and described herein as embodied in an extruded honeycomb body of ceramic and/or metallic material with increased flexibility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a diagrammatic, cross-sectional view of a honeycomb body showing various embodiment options of the invention.

DESCRIPTION OF THE PREFERRED EMBODIMENTS

Referring now to the single FIGURE of the drawing in detail, there is seen a honeycomb body 1 which is generally distinguished by the fact that there are no structures extending in the radial direction as well as no approximately circular rigid structures. Channels or conduits are disposed along lines 3 extending in an involute shape from a center 2 toward the exterior. These lines themselves can be constructed as partitions or separating walls. It is possible in this case to create flow conduits 4 which are only edged by curved surfaces, for example by additional partitions 8 disposed in wave shapes. In another embodiment transverse webs which are provided between the involutely extending partitions 3 can be straight webs 9, so that rectangular or rhomboid cross sections of flow conduits 5 are created. As is indicated by webs 11, the direction of such transverse webs can be adapted to the course of the curved partitions 3, because of which cross-sectional surfaces of conduits 7 that are created in this way can be kept approximately constant. However, polygonal conduits 6 can also be utilized in a honeycomb body in accordance with the invention, although walls 10 of the polygonal conduits 6 are disposed in such a way that the conduits are not disposed along straight lines but instead follow curved lines 3. Finally, as is diagrammatically indicated, it is also possible to provide slits 12 parallel to the curved lines 3 in such a honeycomb body, in particular for the electrical separation of the honeycomb body. It is additionally possible to provide reinforced partitions 13 for a directed introduction of forces or for affecting an oscillating behavior of the honeycomb body.

In accordance with International Patent Application WO 92/02717, corresponding to U.S. application Ser. No. 08/016,041, filed Feb. 10, 1993, it is of course also possible for the curved lines not to follow exactly an involute course but to open more in the outer area or the inner area, through which it is possible to provide different conduit cross sections in the outer or inner areas.

The invention is particularly suitable for extruded honeycomb bodies which are capable of conducting electricity and for areas of use in which large changing thermal loads and therefore large mechanical stresses must be managed.

I claim:

1. An extruded honeycomb body formed of at least one of ceramic or metallic material, comprising:

an extrusion body consisting essentially of extruded powdery material, said body having a multiplicity of conduits formed therein; and partitions separating said conduits from one another, some of said partitions extending curved from the inside outward at least in an outer cross-sectional region of the honeycomb body, whereby said conduits are disposed along curved lines.

2. The honeycomb body according to claim 1, wherein said curved partitions extend from the inside outward in a spiral.

3. The honeycomb body according to claim 1, wherein said curved partitions extend from the inside outward in an approximate involute.

4. The honeycomb body according to claim 1, including transverse webs disposed between said curved partitions, said transverse webs including radially adjacent transverse webs being located in different radial planes.

5. The honeycomb body according to claim 1, wherein said partitions are formed of electrically conductive material and define slits for an electrically insulating subdivision.

6. The honeycomb body according to claim 1, wherein said partitions are formed of an electrically conductive extruded mixture of metal powder and ceramic powder and define slits for an electrically insulating subdivision.

7. The honeycomb body according to claim 5, wherein said slits extend in a curve as seen in cross section.

8. The honeycomb body according to claim 6, wherein said slits extend in a curve as seen in cross section.

9. The honeycomb body according to claim 7, wherein said slits are parallel to said curved partitions.

10. The honeycomb body according to claim 8, wherein said slits are parallel to said curved partitions.

11. The honeycomb body according to claim 7, wherein said slits are spiral.

12. The honeycomb body according to claim 8, wherein said slits are spiral.

13. The honeycomb body according to claim 7, wherein said slits are involute from the inside outward.

14. The honeycomb body according to claim 8, wherein said slits are involute from the inside outward.

15. The honeycomb body according to claim 1, wherein some of said partitions are thicker than others of said partitions.

16. The honeycomb body according to claim 1, wherein said partitions substantially include only curved segments.

17. An extruded honeycomb body formed of at least one of ceramic or metallic material, comprising:
   an extrusion body consisting essentially of extruded powdery material, said extrusion body having a multiplicity of individual flow conduits having a substantially polygonal cross section formed therein; and
   partition separating said flow conduits from one another;
   said flow conduits being disposed along lines being curved from the inside outward, and said flow conduits being spaced apart from one another along said lines, having walls not being parallel to one another.

18. The extruded honeycomb body according to claim 17, wherein said lines are involute.

* * * * *